Jan. 12, 1932.　　　O. G. SIMMONS　　　1,840,538
ECCENTRICITY CHECKING DEVICE
Filed Sept. 23, 1927
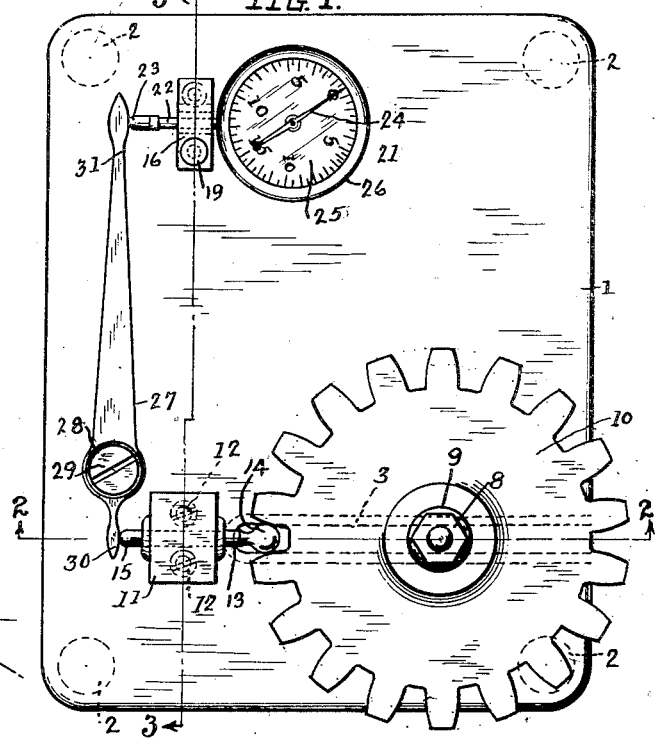
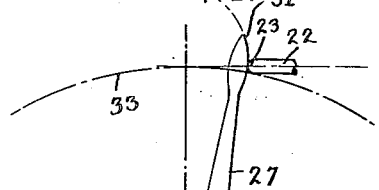
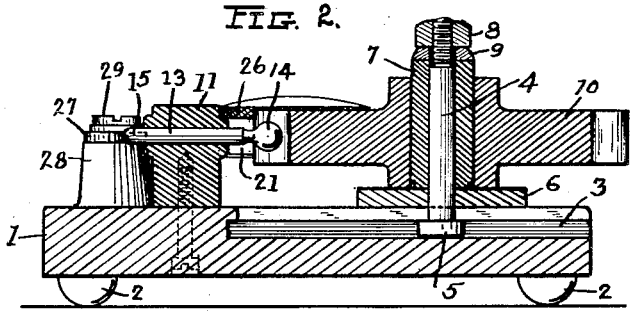
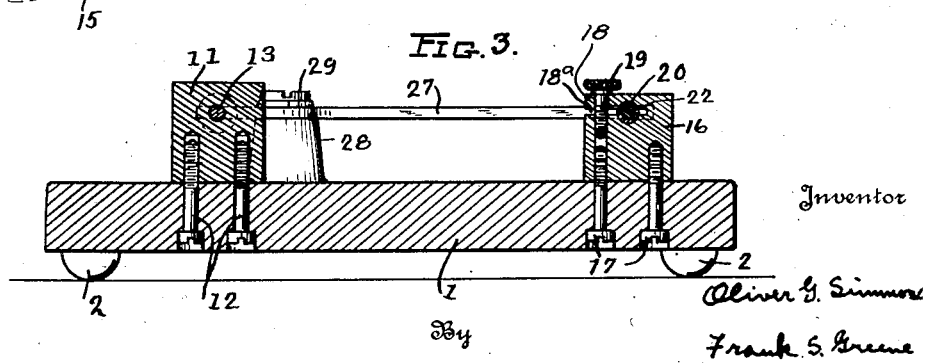
Inventor
Oliver G. Simmons
By Frank S. Greene
Attorney Patented Jan. 12, 1932

1,840,538

UNITED STATES PATENT OFFICE

OLIVER G. SIMMONS, OF LAKEWOOD, OHIO, ASSIGNOR TO THE NATIONAL TOOL COMPANY, OF CLEVELAND, OHIO, A CORPORATION OF OHIO

ECCENTRICITY CHECKING DEVICE

Application filed September 23, 1927. Serial No. 221,596.

This invention relates to an eccentricity checking device for testing gears, gear shaped cutters and kindred articles of manufacture and has for its object to provide means for detecting errors in the positioning of the teeth of such articles relatively the axis thereof and for detecting errors in the spacing of tooth faces between the inner and outer ends thereof, the device being particularly useful in connection with the manufacture of gear shaped cutters which are employed for generating gears.

Gear shaped cutters are required to conform to a theoretically correct form within extremely small limits of error and precision instruments are employed for measuring the circumferential spacing of the teeth and the curvature of the tooth faces. However, in some cases, these tests may show accuracy within the allowed limits, both in the tooth curvature and in the tooth spacing, in a cutter which, in reality, has appreciable error in the centering of the teeth or of the curves of the tooth faces, which errors will result in the production of gears which have imperfect rolling action. Again, errors in curvature may be so combined on opposite faces of adjacent teeth as to make the spacing imperfect between teeth at points between the inner and outer ends of the teeth.

It is the object of the present invention to provide a means by which such errors as may escape detention by the usual tests employed may be made apparent so that the manufacturer, by subjecting the article to the additional test, may be enabled to detect any non-uniformity in the centering of the curves of the two faces or in the spacing of the teeth between the inner and outer ends thereof and may make the necessary correction or adjustment in the generating machine on which the tooth faces are finished to remedy the defect, and so that the user of such cutters may be enabled to more perfectly check the cutters to determine whether or not they possess inherent defects which will prevent the generation of gears of the requisite or desired accuracy.

The following description and accompanying drawings set forth in detail certain means embodying the invention, the disclosed means, however, constituting but one of the various mechanical forms in which the principle of the invention may be employed.

Reference should be had to the accompanying drawings forming a part of this specification in which Figure 1 is a plan view of the eccentricity checking device of the present invention.

Fig. 2 is a section taken on the line indicated at 2—2 in Fig. 1.

Fig. 3 is a section taken on the line indicated at 3—3 in Fig. 1.

Fig. 4 is a diagrammatic view illustrating the action of the movement multiplying lever interposed between the tooth engaging finder and the actuating plunger of the dial indicator.

Referring to the accompanying drawings, the device of the present invention is mounted upon a substantially flat base member 1, which is provided at each of its four corners with short supporting legs 2, by which it may be supported upon a table or other suitable support. The base member 1 is provided with an undercut slot 3 extending inwardly from a side edge thereof, the undercut slot being provided for the purpose of permitting adjustment of a supporting spindle for the gear, gear shaped cutter or a similar article, as will be presently explained. The supporting spindle comprises a vertical bolt 4 having a T-head 5, which has a sliding fit in the undercut portion of the slot 3, the bolt extending upwardly through a disc 6 and a sleeve 7, upon which the hub bore of the gear, gear shaped cutter or the like, fits. The bolt 4 has a threaded upper end, which receives a nut 8 and a tapered washer 9 which rests upon the upper end of the sleeve 7. By tightening the nut 8, the overhanging portions of the groove 3 are clamped between the head 5 and disc 6 and the sleeve 7 and washer 9 are rigidly clamped between the disc 6 and the nut 8. By loosening the nut 8, the spindle may be adjusted along the slot 3 and rigidly clamped in a new position, the adjustment being provided to permit the device to accommodate gears or gear shaped cutters of different diameters.

Figs. 1 and 2 show a gear 10 in testing position on the spindle. Adjacent the inner end of the slot 3, there is a standard 11 which is rigidly secured to the base 1 by means of screws 12, and this standard is provided with an accurately formed cylindrical bore in which is mounted a finder 13 which has an accurately formed cylindrical body portion, which has a close sliding fit in the bore of the standard. The finder 13 has an enlarged head 14 which is of a size such that it may enter the space between adjacent teeth of a gear, gear shaped cutter or the like, the head having a surface curvature such that it is adapted to have tangential point contact with the adjacent tooth faces. As herein shown, the head 14 is of spherical shape, the spherical form having advantages which will be hereinafter more fully explained. The finder 13 has a rounded outer end 15 through which movement is transmitted to a registering mechanism, which will be later described. At a point spaced laterally from the standard 11, a second standard 16 is rigidly secured to the base 1 by screws 17, the standard 16 being provided with a resilient clamping arm 18, which is an integral part of the standard separated from the body thereof by a kerf 18—a. A screw 19 is provided for drawing the clamping arm 18 toward the body of the standard to clamp the sleeve 20, which forms part of the casing of a dial indicator 21, which has an actuating plunger 22 extending through the sleeve 20, the actuating plunger 22 being provided with a rounded outer end 23 for engagement with a suitable actuating member.

The indicator is of the type commonly employed for measuring minute variations in the contour or dimensions of an article being machined, and is provided with a rotatable pointer 24, the usual movement multiplying mechanism for actuating the pointer and the usual spring for normally holding it in its zero position. Since the dial indicator herein shown is old and well known, it is not herein illustrated in detail. The indicator has the usual dial 25 provided with graduations along its periphery beneath the outer end of the pointer and this dial is carried by a bezel 26, which is rotatably mounted upon the indicator casing so that the zero point on the dial may be adjusted to any desired position with respect to the zero position of the pointer 24.

A movement multiplying lever 27 is interposed between the finder 13 and the actuating plunger 22 of the indicator, the lever 27 being mounted upon a standard 28 to pivot upon a shoulder screw 29, which secures the lever to the top of the standard. The pivot of the lever 27 is adjacent the standard 11 so that the lever has a short arm 30, which engages the finder 13 and a long arm 31, which engages with the plunger 22. The opposite side faces of the arm 30 and also the opposite side faces at the end of the long arm 31 are formed on involute curves in order to maintain an exact proportion between the movement of the finder 13, which engages a side face of the arm 30 and the plunger 22, which engages a side face of the arm 31. As shown in Fig. 4 of the drawings, the involute curves of the arm 30 are involutes of a base circle 32 whose center is at the pivotal axis of the lever and which is tangent to the longitudinal axis of the finder 13. The involutes at the outer end of the arm 31 are involutes of a base circle which has its center at the pivotal axis of the lever and which is tangent to the longitudinal axis of the plunger 22. The rounded ends 15 and 23 of the finder 13 and plunger 22 engage with the involute faces of the lever at points in the longitudinal axes of the finder and plunger and since the normals of an involute are always tangent to the evolute, the involute faces of the lever will in all positions of the lever engage the rounded end 15 of the finder and the rounded end 22 of the plunger at the axis of the finder and plunger. An involute of a circle has a uniform lead along a line tangent to the circle. Consequently, the longitudinal movement of the finder 13 will be exactly proportional to the angular movement of the arm 30, measured on the base circle 32 and the longitudinal movement of the plunger 22 will be exactly proportional to the angular movement of the arm 31, measured on the base circle 33, and the ratio of the movement of the plunger 22 with respect to the movement of the finder 13 will be equal to the radius of the base circle 33 divided by the radius of the base circle 32 and this ratio is accurately maintained throughout the angular movement of the lever.

The sleeve 7, which is of a size to fit closely within the hub bore of the gear or gear shaped cutter to be tested permits a gear or cutter to be readily placed on or taken from the spindle. Assuming that the spindle is properly adjusted with respect to the standard 11, and that the head 14 of the finder is of the proper size for the gear or gear shaped cutter to be tested, the gear or gear shaped cutter is slipped on to the spindle and as the gear shaped member is lowered on the spindle, the gear is turned by hand until a space between adjacent teeth is directly over the head 14. As the gear shaped article drops down on to the head 14, the lower edges of a tooth face will engage the convex top portion of the conical head and in sliding over the head, will turn the gear to a position to center the tooth space with respect to the head 14. The weight of the gear acting through the lower edges of the two adjacent tooth faces engaging the head will then force the head 14 outwardly a sufficient distance to permit the gear to drop down onto the disc 6. When the gear is thus positioned on the spindle, the head 14 of the finder will have tangential point contact with the adjacent tooth faces at points between the inner and outer ends of the teeth. Whatever movement is imparted to the finder 13 will be multiplied and transmitted to the plunger 22 of the indicator, shifting the pointer 24 through an angle proportional to the movement of the plunger 22.

Assuming that a movement of the pointer corresponding to the space between adjacent graduations of the dial represents a movement of one-thousandth of an inch and that the ratio of the lever arms 30 and 31 is 5 to 1, an angular movement of the pointer equal to one space on the dial would represent a movement of the finder 13 equal to two ten-thousandths of an inch. After the gear or gear shaped cutter has been positioned on the spindle, the bezel 25 is turned to bring the zero point of the dial beneath the pointer 24 and the gear or gear shaped cutter is lifted clear of the finder 13, turned one tooth space and lowered to bring the head 14 of the finder into the next adjacent tooth space. If the second tooth space corresponds exactly with the first, the pointer 24 should return to the zero point. This operation is continued until the head 14 of the finder has been engaged in each of the tooth spaces of the gear or gear shaped cutter and the extent of variation of the readings on the dial will show the uniformity or lack of uniformity in the spacing of tooth faces due either to inaccuracies in tooth contours or eccentricity of tooth curves.

What I claim is:

1. An eccentricity checking device for gears, gear shaped cutters and kindred articles of manufacture comprising a base member, a supporting spindle for the article to be tested, a finder mounted on the base member for movement toward and from the axis of the spindle, said finder being in the form of a solid body of a size to enter between adjacent teeth of the article on the spindle and having tooth engaging portions so curved as to have tangential point contact with opposed faces of adjacent teeth, a dial indicator mounted on the base member independently of the finder, said indicator having an actuating plunger, and a lever mounted on the base member independently of the finder and indicator, said lever having a short arm engaging the finder and a long arm engaging the indicator actuating plunger.

2. An eccentricity checking device for gears, gear shaped cutters and kindred articles of manufacture comprising a base member, an upright supporting spindle for the article to be tested attached to the base member, a finder mounted on the base member for movement toward and from the axis of the spindle, said finder having a spherical tooth engaging portion of a diameter to enter between adjacent teeth on the spindle, an indicator mounted on the base member independently of the finder and having a graduated dial, a pointer movable along the graduations of said dial and a movable pointer actuating member, and a lever pivoted to the base member, said lever having a short arm engaging the finder and a long arm engaging said actuating member.

3. An eccentricity checking device for gears, gear shaped cutters and kindred articles of manufacture, comprising a base member, a supporting spindle for articles to be tested secured to said base member, a standard on said base member spaced laterally from said spindle, a finder in the form of a rod slidably mounted for endwise movement in said standard, said rod being positioned radially with respect to the spindle axis and having a ball shaped tooth engaging end portion of a diameter to enter between adjacent teeth of a gear shaped article on the spindle and to engage with the opposed tooth faces thereof, a dial indicator mounted on the base member, said indicator having an endwise movable actuating plunger, and a lever pivoted on the base member and having plunger and finder rod engaging faces formed on involutes of circles whose centers are at the pivotal axis of the lever, the base circles of the involutes being tangential to the longitudinal axes of the plunger and rod.

4. An eccentricity checking device for gears, gear shaped cutters and kindred articles of manufacture, comprising a base member, a supporting spindle for articles to be tested, secured to said base member, a standard on said base member spaced laterally from said spindle, a finder in the form of a rod slidably mounted for endwise movement in said standard, said rod being positioned radially with respect to the spindle axis and having a ball shaped tooth engaging end portion of a diameter to enter between adjacent teeth of a gear shaped article on the spindle and to engage with the opposed tooth faces thereof, a dial indicator mounted on the base member, said indicator having an endwise movable actuating plunger, and a lever pivoted on the base member and having plunger and finder rod engaging faces formed on involutes of circles whose centers are at the pivotal axis of the lever, the base circles of the involutes being tangential to the longitudinal axes of the plunger and rod, and said plunger and rod having rounded ends providing point contact at their axes with the involute faces of the lever.

5. An eccentricity checking device for gears, gear shaped cutters and kindred articles of manufacture, comprising a base member having a linear guideway, an upright supporting spindle for articles to be tested mounted for adjustment along said guideway, a standard on said base member, a finder in the form of a rod slidably mounted for endwise movement in said standard, said rod being positioned in alinement with the guideway and radially with respect to the spindle axis, said rod having a ball shaped tooth engaging end portion of a diameter to enter between adjacent teeth of the gear shaped article on the spindle and to engage with the opposed tooth faces thereof, a dial indicator mounted on the base member laterally of the guideway, said indicator having an actuating plunger disposed parallel with said finder rod and a horizontally disposed lever pivoted to the base member adjacent the standard, said lever having a short arm engaged by said finder rod and having a long arm engaging said dial actuating plunger.

In testimony whereof I affix my signature.

OLIVER G. SIMMONS.